United States Patent
Subramaniam

(10) Patent No.: US 12,360,885 B2
(45) Date of Patent: *Jul. 15, 2025

(54) END USER REMOTE ENTERPRISE APPLICATION SOFTWARE TESTING

(71) Applicant: DevFactory Innovations FZ LLC, Dubai (AE)

(72) Inventor: Rahul Subramaniam, Dubai (AE)

(73) Assignee: DevFactory Innovations FZ-LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,427

(22) Filed: Jun. 9, 2023

(65) Prior Publication Data
US 2023/0401142 A1 Dec. 14, 2023

Related U.S. Application Data

(63) Continuation of application No. 17/856,925, filed on Jul. 1, 2022, now Pat. No. 11,709,762, which is a
(Continued)

(51) Int. Cl.
*G06F 11/36* (2025.01)
*G06F 8/70* (2018.01)
(Continued)

(52) U.S. Cl.
CPC ............ *G06F 11/3698* (2025.01); *G06F 8/70* (2013.01); *G06F 11/3672* (2013.01);
(Continued)

(58) Field of Classification Search
CPC .. G06F 11/36; G06F 11/3664; G06F 11/3672; G06F 11/3684; G06F 11/3688; G06F 11/3692
See application file for complete search history.

(56) References Cited

U.S. PATENT DOCUMENTS

| | | | | |
|---|---|---|---|---|
| 5,737,517 A | * | 4/1998 | Kite | .................... H04M 3/2254 714/33 |
| 5,926,631 A | * | 7/1999 | McGarvey | ............ G06F 21/105 709/200 |

(Continued)

OTHER PUBLICATIONS

Notice of Allowance mailed on Mar. 7, 2023, filed in U.S. Appl. No. 17/826,925, pp. 1-4.
(Continued)

*Primary Examiner* — Kamini B Patel
(74) *Attorney, Agent, or Firm* — Kent B. Chambers; Terrile, Cannatti & Chambers, LLP

(57) ABSTRACT

A system and method for remote testing of enterprise software applications (ESA) allows one or more testers to remotely access an ESA and remotely test the ESA. In at least one embodiment, the ESA resides in a testing platform that includes one more computers that are provisioned for testing. "Provisioning" a computer system (such as one or more servers) refers to preparing, configuring, and equipping the computer system to provide services to one or more users. In at least one embodiment, the computer system is provisioned to create an ESA operational environment in accordance with a virtual desktop infrastructure (VDI) template interacting with virtualization software.

13 Claims, 5 Drawing Sheets

Related U.S. Application Data continuation of application No. 17/129,780, filed on Dec. 21, 2020, now Pat. No. 11,409,638, which is a continuation of application No. 16/165,986, filed on Oct. 19, 2018, now Pat. No. 10,877,872, which is a continuation of application No. 15/267,406, filed on Sep. 16, 2016, now Pat. No. 10,114,734, which is a continuation of application No. 14/615,510, filed on Feb. 6, 2015, now Pat. No. 9,471,475, which is a continuation of application No. 13/487,085, filed on Jun. 1, 2012, now Pat. No. 9,003,237.

(60) Provisional application No. 61/492,564, filed on Jun. 2, 2011.

(51) Int. Cl.
    *G06F 11/3668* (2025.01)
    *G06F 11/3698* (2025.01)
    *H04L 67/02* (2022.01)

(52) U.S. Cl.
    CPC ...... *G06F 11/3684* (2013.01); *G06F 11/3688* (2013.01); *G06F 11/3692* (2013.01); *H04L 67/02* (2013.01)

(56) References Cited

U.S. PATENT DOCUMENTS

| | | | | |
|---|---|---|---|---|
| 6,557,009 B1* | 4/2003 | Singer | ............... | G06Q 10/10 715/740 |
| 8,341,462 B2* | 12/2012 | Broda | ............... | G06F 11/0793 714/25 |
| 2006/0074618 A1* | 4/2006 | Miller | ............... | G06F 11/3664 703/13 |
| 2006/0090136 A1* | 4/2006 | Miller | ............... | G06F 9/45504 715/734 |
| 2011/0145795 A1* | 6/2011 | Khanapurkar | ...... | G06F 11/3466 717/126 |
| 2012/0017112 A1* | 1/2012 | Broda | ............... | G06F 11/0793 715/709 |
| 2012/0209947 A1* | 8/2012 | Glaser | ............... | G06F 9/5027 709/217 |
| 2012/0303476 A1* | 11/2012 | Krzyzanowski | ........ | G06F 16/00 705/26.61 |
| 2013/0268920 A1* | 10/2013 | Ursal | ............... | G06F 8/70 717/131 |

OTHER PUBLICATIONS

Terminal Disclaimer Approved on Feb. 13, 2023, filed in U.S. Appl. No. 17/826,925, p. 1.

Terminal Disclaimer Filed on Feb. 13, 2023, filed in U.S. Appl. No. 17/826,925, pp. 1-3.

Response to Non-Final Office Action dated Feb. 13, 2023, filed in U.S. Appl. No. 17/826,925, pp. 1-7.

Non-Final Office Action mailed Oct. 13, 2023, filed in U.S. Appl. No. 17/826,925, pp. 1-16.

* cited by examiner

FIG. 4

END USER REMOTE ENTERPRISE APPLICATION SOFTWARE TESTING

CROSS-REFERENCE TO RELATED APPLICATION

This application claims the benefit under 35 U.S.C. § 119(e) and 37 C.F.R. § 1.78 of U.S. Provisional Application No. 61/492,564, filed Jun. 2, 2011, and entitled "End User Remote Enterprise Application Software Testing", which is incorporated by reference in its entirety.

BACKGROUND OF THE INVENTION

Field of the Invention

The present invention relates in general to the field of information processing, and more specifically to a system and method for allowing users to remotely test enterprise application software.

Description of the Related Art

Enterprise application software (EAS), also known as enterprise software or enterprise software application (ESA), is software used in organizations, such as in a business or government. Services provided by ESA are typically business-oriented tools such as online shopping and online payment processing, interactive product catalogue, automated billing systems, security, content management, information technology service management, customer relationship management, resource planning, business intelligence, human resources management, manufacturing, application integration, and forms automation. ESA is typically hosted on servers and provides simultaneous services to a large number of users, typically over a computer network. ESA contrasts with a single-user application that is executed on a user's personal computer and serves only one user at a time.

Extensive testing of EAS generally precedes organization-wide deployment. Purchase of EAS often ranges from thousands of US dollars to millions of US dollars. Also, computing platforms often vary from organization to organization. (A "computing platform" refers to a particular hardware architecture and software framework that allows the EAS to execute.) Furthermore, EAS may have varying customizations from organization to organization. For these exemplary reasons and because deployment of EAS often affects many users within an organization, extensive testing of EAS should generally precede organization-wide deployment.

The testing process of EAS prior to organizational-wide deployment, involves several operations. FIG. 1 depicts one exemplary, pre-deployment EAS testing process 100. In operation 102, testing personnel request allocation of a new testing server or servers that will be used for EAS testing. Because EAS generally utilizes a number of different purposed servers, generally, multiple test servers are allocated for the purposes of EAS testing. The servers may be purposed as application servers, database servers, etc. Allocation of a new testing server or servers takes time $T_1$, and $T_1$ can often take up to one (1) week and can involve acquiring a new testing server or servers, providing a working network environment, configuring the servers for their purpose, and segregating the test servers into a test environment rather than a 'live' operational environment.

In operation 102, software is downloaded to the testing servers, installed, and the testing servers are setup. The software includes not only the EAS but also, for example, software library files, Java™, database applications, etc. Operation 102 takes time $T_2$, and time $T_2$ can often take up to one (1) additional week.

In operation 104, testing and problem reporting begins. A large part of the testing operation 104 involves problem reporting. Problem reporting often involves setup issues, and 60-80% of all problems can often be related to setup issues. Operation 104 takes time $T_3$, and time $T_3$ can take 2-5 weeks or more. Problem reporting, trouble-shooting, and applying fixes also requires a large amount of interfacing with the EAS supplier thereby incurring personnel costs by the EAS supplier.

Additionally, operations 102, 104, and 106 involve the allocation of knowledgeable testing personnel. Delays, sometimes on the order of months, may occur in obtaining personnel with the right mix of skills to conduct all of operations 102, 104, and 106.

Consequently, EAS deployment is often a 6-12 month process. Because of the large time delays involved in deploying EAS, the acquisition rate of new EAS software is relatively low compared with many other product purchases.

SUMMARY OF THE INVENTION

In one embodiment of the present invention, a method includes receiving a request with a computer from an end user using a computer to access an enterprise software application (ESA) hosted by an EAS testing platform that is remote from the computer used by the end user. The method also includes receiving data from the computer to test the ESA, wherein the remote EAS testing platform is provisioned to emulate an actual operating environment for which the ESA is being tested. The method further includes testing the ESA in the computer.

In another embodiment of the present invention, an apparatus includes an enterprise software application (ESA) testing computer platform hosting an enterprise software application. The EAS testing platform includes one or more computers that are remote from a computer used by an end user providing data to test an ESA. During operation, the EAS testing platform is capable of receiving the data to test the ESA and to execute the ESA.

In a further embodiment of the present invention, a computer readable medium includes code stored therein for comprising code stored therein and executable by a processor for receiving a request with a computer from an end user using a computer to access an enterprise software application (ESA) hosted by an EAS testing platform that is remote from the computer used by the end user. The code is further executable by the processor for receiving data from the computer to test the ESA, wherein the remote EAS testing platform is provisioned to emulate an actual operating environment for which the ESA is being tested. The code is further executable by the processor for testing the ESA in the computer.

In another embodiment of the present invention, an apparatus includes means for receiving a request with a computer from an end user using a computer to access an enterprise software application (ESA) hosted by an EAS testing platform that is remote from the computer used by the end user. The apparatus further includes means for receiving data from the computer to test the ESA, wherein the remote EAS testing platform is provisioned to emulate an actual operating environment for which the ESA is being tested. The apparatus also includes means for testing the ESA in the computer.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 depicts a login web page.

DETAILED DESCRIPTION

A system and method for remote testing of enterprise software applications (ESA) allows one or more testers to remotely access an ESA and remotely test the ESA. Each tester is an actual person, and is an end user in that the tester actually tests the ESA via a tester computer. In at least one embodiment, the ESA resides in an ESA testing platform. An "EAS testing platform" includes a particular hardware and software configuration that allows the ESA to execute and includes one more computers that are provisioned for testing. "Remote" indicates accessibility via an extranet network, such as the Internet. "Provisioning" a computer system (such as one or more servers) refers to preparing, configuring, and equipping the computer system to provide services to one or more users.

In at least one embodiment, the computer system is provisioned to create an ESA operational environment in accordance with a virtual desktop infrastructure (VDI) template interacting with virtualization software. In at least one embodiment, the VDI template is created by an entity, such as a human expert, who has sufficient knowledge about the ESA computer system environment of the organization for which the ESA is being tested to provision an ESA testing computer system. By using the expert created VDI, the computer system is provisioned with the correct operating system, emulated hardware, correct supporting software, such as libraries, Java™, database applications, application program interfaces, drivers, hardware configuration, web server applications, and other software applications with which the ESA interacts, etc.

Utilizing the remotely provisioned ESA testing platform can, in at least one embodiment, eliminate most of if not all setup issues that conventionally occur, thus, eliminating, in at least one embodiment, 60-80% of problems incurred during ESA testing. Furthermore, in at least one embodiment, during testing, testers can record a "snapshot" of the provisioned ESA testing platform when a problem occurs. In at least one embodiment, a "snapshot" records data such as software, hardware, and/or user interface state information. The snapshot can be transmitted to or concurrently made available to ESA support personnel. In at least one embodiment, the ESA support personnel can then promptly analyze and resolve the problem.

Figure 1:
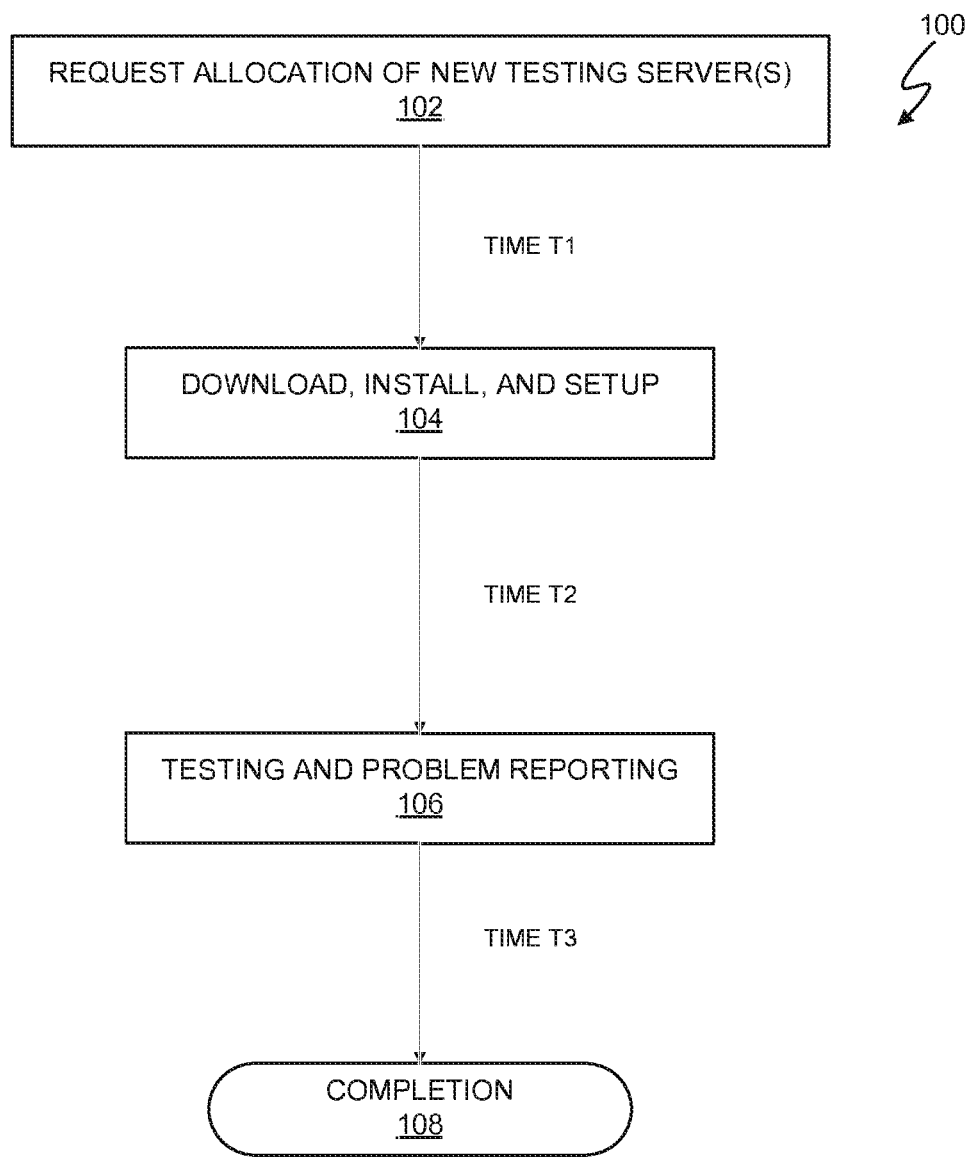
FIG. 1 (labeled prior art) depicts a pre-deployment EAS testing process.
Figure 2:
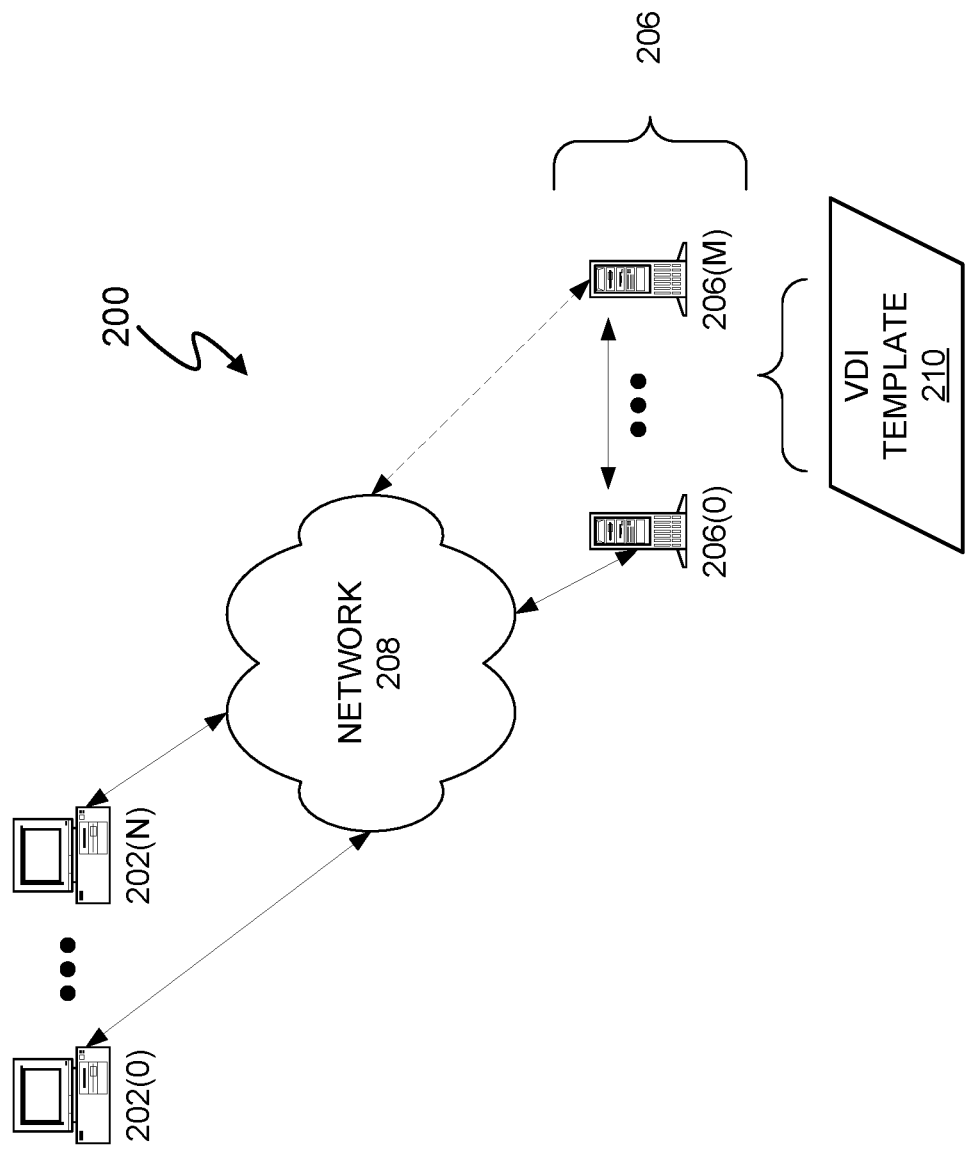
FIG. 2 depicts a remote ESA testing process.

FIG. 2 represents an exemplary ESA testing environment 200. Tester computers 202(0)-202(N) are used by testers to evaluate ESA resident on the remote ESA testing platform 204, where "N" is an integer index ranging from 0 to the number of tester computers plus one. The ESA testing platform 204 hosts an ESA environment that is set up by, for example, an entity knowledgeable about an actual operating environment for which the ESA is being evaluated. The ESA testing platform 204 includes M+1 computers 206(0)-206(M), where "M" is an integer index ranging from 0 to the number of ESA testing provisioned computers plus one. The tester computers 202(0)-202(N) communicate with the ESA testing provisioned computers 206(0)-206(M) via a network 208. In at least one embodiment, the network 208 includes the Internet. In at least one embodiment, the ESA testing provisioned computers 206(0)-206(M) are computers in a cloud environment and are acquired via a web-based cloud computing service such as in the Amazon elastic computer cloud (Amazon EC2) web service. In at least one embodiment, the ESA testing provisioned computers 206(0)-206(M) are dedicated computers provided by the ESA owner or an entity contracted with or under control of the ESA owner. In at least one embodiment, the ESA testing provisioned computers 206(0)-206(M) include virtualization software from, for example, VMLogix, which is a part of Citrix Systems of Florida or VMware, Inc. of California.

Figure 3:
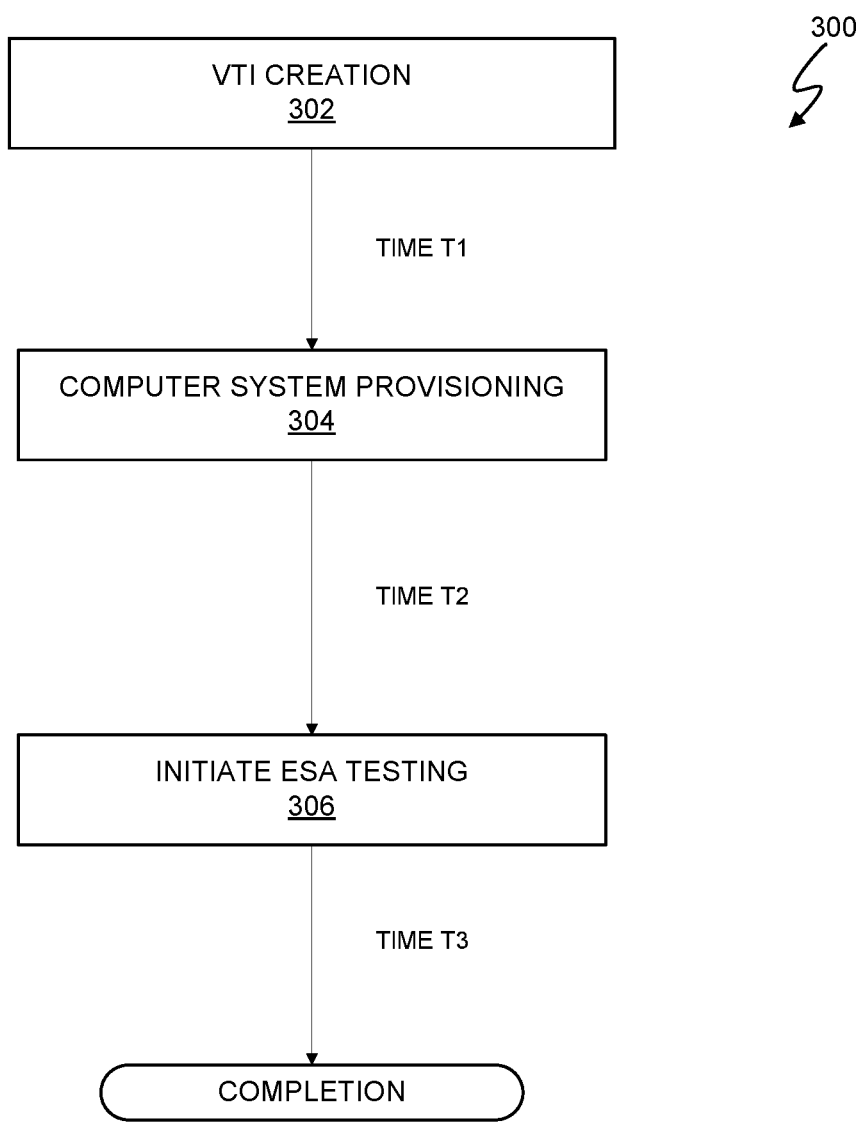
FIG. 3 depicts an exemplary provisioning and ESA testing process.

FIG. 3 depicts an exemplary provisioning and ESA testing process 300. Referring to FIGS. 2 and 3, in operation 302, an entity knowledgeable about an actual operating environment of an ESA creates a VDI template 210. In at least one embodiment, the entity is a person who is an expert in the actual operating environment of an ESA. In at least one embodiment, the VDI template 210 is created using any well-known VDI template creation software tool. The content of the VDI template 210 serves as a management layer to provision the ESA testing platform 204. In at least one embodiment, the VDI template 210 includes information to provision the ESA testing provisioned computers 206(0)-206(M) with the correct operating system, emulated hardware, correct supporting software, such as libraries, Java™, database applications, application program interfaces, drivers, hardware configuration, web server applications, and other software applications with which the ESA interacts, etc. In at least one embodiment, the VDI template 210 is an instance of a master VDI template. In at least one embodiment, the VDI template 210 has a limited life window that provisions the ESA testing provisioned computers 206(0)-206(M) for a predetermined amount of time, such as one (1) week. The predetermined amount of time is, for example, sufficient to complete testing of the ESA and limits costs associated with the acquiring the ESA testing provisioned computers 206(0)-206(M).

Operation 306 initiates ESA testing. In at least one embodiment, an ESA tester accesses a login web page, such as the login web page 300 of FIG. 4. The tester enters the requested name, company, email id, accepts the terms and conditions, and selects the Submit button to obtain login data for logging into the ESA testing platform 204. In at least one embodiment, the login data includes a username, password, and link to launch the ESA hosted by the ESA testing platform 204. In at least one embodiment, all clusters of supporting applications hosted by the ESA testing provisioned computers 206(0)-206(M) are also launched so that the ESA testing platform 204 emulates an actual operating environment of the organization for which the ESA is being tested.

Testers can now test the ESA from the tester computers 202(0)-202(N) by, for example, interacting with the ESA. Exemplary interactions with the ESA include sending data to exercise the functionality and other operational characteristics of the ESA. In at least one embodiment, during testing, testers record a "snapshot" of the ESA testing platform 204 or of a specific computer or computers therein when a problem occurs. The snapshot can be transmitted to or concurrently made available to ESA support personnel. In at least one embodiment, the ESA support personnel can then promptly analyze and resolve the problem. In at least one embodiment, upon completion of completion, results of the tests can be provided by the tester computers 202(0)-202(N) to one or more user computers. In at least one embodiment, the users can monitor execution of the ESA real-time via one or more remote connections to the tester computers 202(0)-202(N) and the results are evident from monitoring execution or can also be provided to one or more user computers.

In at least one embodiment, in addition to eliminating, in at least one embodiment, 60-80% of problems incurred during ESA testing, utilizing the remotely provisioned ESA testing platform eliminates computer acquisition and setup time by the organization, and allows testers for the organization to focus on testing the ESA. Accordingly, in at least one embodiment, the time from the initiation of testing to completion is virtually completely occupied by setup problem-free testing rather than incurring and resolving setup issues. In at least one embodiment, ESA testing can be accomplished within one (1) week, and total time from initiation to deployment can be reduced from 6-12 months to 10 days.

Figure 5:
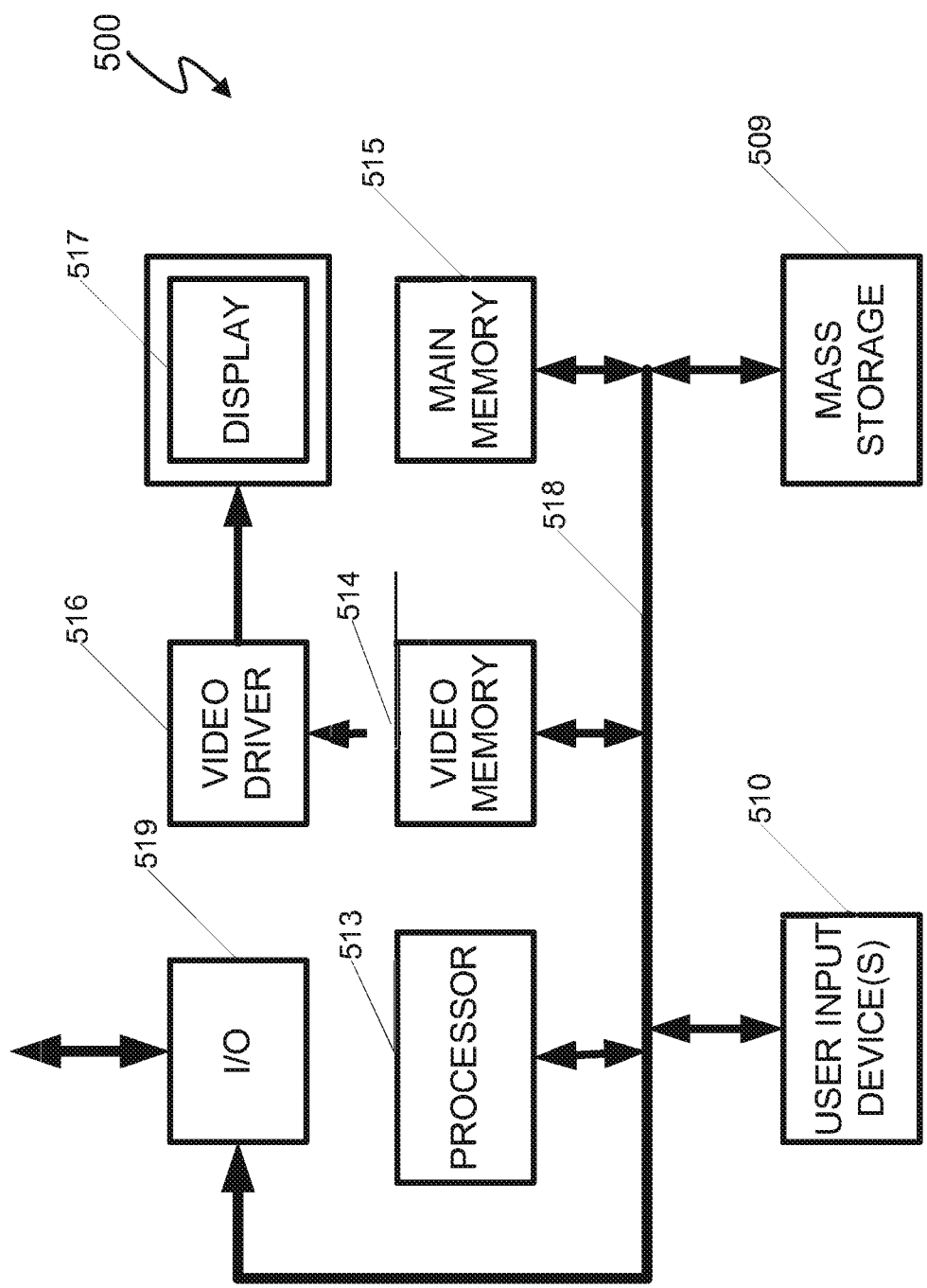
FIG. 5 depicts an exemplary computer.

Embodiments of the tester computers 202(0)-202(N) and ESA testing provisioned computers 206(0)-206(M) can be implemented on a computer system such as a general-purpose computer 500 illustrated in FIG. 5. Input user device(s) 510, such as a keyboard and/or mouse, are coupled to a bi-directional system bus 518. The input user device(s) 510 are for introducing user input to the computer system and communicating that user input to processor 513. The computer 500 of FIG. 5 generally also includes a video memory 514, main memory 515 and mass storage 509, all coupled to bi-directional system bus 518 along with input user device(s) 510 and processor 513. The mass storage 509 may include both fixed and removable media, such as other available mass storage technology. Bus 518 may contain, for example, 32 address lines for addressing video memory 514 or main memory 515. The system bus 518 also includes, for example, an n-bit data bus for transferring DATA between and among the components, such as CPU 509, main memory 515, video memory 514 and mass storage 509, where "n" is, for example, 32 or 64. Alternatively, multiplex data/address lines may be used instead of separate data and address lines.

I/O device(s) 519 may provide connections to peripheral devices, such as a printer, and may also provide a direct connection to a remote server computer systems via a telephone link or to the Internet via an ISP. I/O device(s) 519 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs, such as the ESA, and data, such as VTI 208, are generally stored as instructions and data in a non-transitory mass storage 509 until loaded into main memory 515 for execution. Computer programs may also be in the form of electronic signals modulated in accordance with the computer program and data communication technology when transferred via a network.

The processor 513, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 515 is comprised of dynamic random access memory (DRAM). Video memory 514 is a dual-ported video random access memory. One port of the video memory 514 is coupled to video amplifier 516. The video amplifier 516 is used to drive the display 517. Video amplifier 516 is well known in the art and may be implemented by any suitable means. This circuitry converts pixel DATA stored in video memory 514 to a raster signal suitable for use by display 517. Display 517 is a type of monitor suitable for displaying graphic images.

In at least one embodiment, this novel use of, for example, VDI templates, cloud computing, and virtualization software allows for efficient ESA testing. Additionally, sales cycles can be improved by removing costly impediments to adopting ESA's. Furthermore, ESA development can provide more incremental changes due to reduced deployment times and costs.

Although the present invention has been described in detail, it should be understood that various changes, substitutions and alterations can be made hereto without departing from the spirit and scope of the invention as defined by the appended claims.

What is claimed is:

1. An apparatus comprising:
   means, including one or more processors, for electronically transmitting a virtual desktop infrastructure template to a computer system, wherein the virtual desktop infrastructure template is configured to transform a first computer into an enterprise software application (ESA) testing platform computer system in accordance with the virtual desktop infrastructure template interacting with virtualization software executing on the first computer, wherein the ESA testing platform computer system hosts an enterprise software application, wherein the first computer system comprises:
   means, including one or more processors, for receiving a request from an end user using a second computer to access an ESA hosted by the ESA testing platform computer system that is remote from the second computer used by the end user;
   means for receiving data with the ESA testing platform computer system from the second computer to test the ESA, wherein the remote ESA testing platform computer system is provisioned to emulate an actual operating environment for which the ESA is being tested; and
   means, including one or more processors, for testing the ESA in the ESA testing platform computer system.

2. The apparatus of claim 1 further comprising:
   means for providing test results from the testing of the ESA to the second computer used by the end user.

3. The apparatus of claim 1 further comprising:
   means, including one or more processors, for provisioning the remote ESA testing platform computer system using a virtual desktop interface template.

4. The apparatus of claim 1 further comprising:
   means, including one or more processors, for accessing the ESA testing platform computer system via cloud computing web service.

5. The apparatus of claim 1 further comprising:
means for recording a "snapshot" of the ESA testing platform computer system during testing of the ESA.

6. The apparatus of claim 5 further comprising: means, including one or more processors, for transmitting the snapshot to at least one of the second computer system or a third computer system.

7. An apparatus comprising:
means, including one or more processors, for receiving an electronically transmitted virtual desktop infrastructure template with a first computer system;
means, including one or more processors, for utilizing the virtual desktop infrastructure template as a management layer to provision the first computer system and transform the first computer into an enterprise software application (ESA) testing platform computer system in accordance with the virtual desktop infrastructure template interacting with virtualization software executing on the first computer, wherein the ESA testing platform computer system hosts an enterprise software application;
means for receiving a request from an end user using a second computer to access an ESA hosted by the ESA testing platform computer system that is remote from the second computer used by the end user;
means for receiving data from the second computer to test the ESA, wherein the remote ESA testing platform computer system is provisioned to emulate an actual operating environment for which the ESA is being tested; and
means, including one or more processors, for testing the ESA in the ESA testing platform computer system.

8. The apparatus of claim 7 wherein the ESA testing platform computer system is provisioned using a virtual desktop interface.

9. The apparatus of claim 7 wherein the ESA testing platform computer system is accessible via a cloud computing web service.

10. The apparatus of claim 7 wherein the ESA testing platform computer system comprises one or more processors coupled to one or more memories having the enterprise software application stored therein.

11. The apparatus of claim 7 wherein the ESA testing platform computer system is provisioned to emulate an actual operating environment for which the ESA is being tested.

12. The apparatus of claim 7 wherein the ESA testing platform computer system comprises:
means for providing test results from the testing of the ESA to the computer used by the end user.

13. The apparatus of claim 7 wherein the ESA testing platform computer system comprises:
means for recording a "snapshot" of the ESA testing platform during testing of the ESA.

* * * * *